US012370685B2

United States Patent
Cahn et al.

(10) Patent No.: US 12,370,685 B2
(45) Date of Patent: Jul. 29, 2025

(54) SYSTEM AND METHOD FOR SUPPORTING WOODEN MEMBERS DURING INSTALLATION OF NAIL PLATES IN WOODEN STRUCTURES

(71) Applicant: BotBuilt, Inc., Durham, NC (US)

(72) Inventors: Aaron Cahn, Durham, NC (US); Christopher Barrett Ames, Durham, NC (US)

(73) Assignee: BotBuilt, Inc., Durham, NC (US)

( * ) Notice: Subject to any disclaimer, the term of this patent is extended or adjusted under 35 U.S.C. 154(b) by 0 days.

(21) Appl. No.: 18/819,986

(22) Filed: Aug. 29, 2024

(65) Prior Publication Data

US 2025/0073900 A1    Mar. 6, 2025

Related U.S. Application Data

(60) Provisional application No. 63/579,471, filed on Aug. 29, 2023.

(51) Int. Cl.
*G06F 17/00* (2019.01)
*B25J 9/16* (2006.01)
(Continued)

(52) U.S. Cl.
CPC ........... *B25J 9/1656* (2013.01); *B25J 11/005* (2013.01); *B25J 15/02* (2013.01)

(58) Field of Classification Search
CPC ......... B25J 9/1656; B25J 11/005; B25J 15/02
(Continued)

(56) References Cited

U.S. PATENT DOCUMENTS 3,207,406 A    9/1965 Bowman
3,915,444 A    10/1975 Moehlenpah
(Continued)

FOREIGN PATENT DOCUMENTS

| AU | 2017326927 A1 * | 3/2019 | ............. B28B 1/001 |
| CN | 109923264 A * | 6/2019 | ............. B28B 1/001 |
| WO | WO-2023215527 A2 * | 11/2023 | |

OTHER PUBLICATIONS

Concepts-for-Timber-Joints-in-Robotic-Building-Processes (Year: 2018).*

(Continued)

*Primary Examiner* — Ronnie M Mancho
(74) *Attorney, Agent, or Firm* — Goodwin Procter LLP

(57) ABSTRACT

An autonomous system for supporting wooden members is presented. The autonomous system includes a mobile robot configured to lift, move, and position robotic jack stands on a working surface. The autonomous system also includes a robotic jack stand with electromagnets operable to demagnetize when the mobile robot lifts the robotic jack stand from the working surface and magnetize when the mobile robot positions the robotic jack stand onto the working surface. The robotic jack stand also includes a vise member with a stationary member and a sliding member. A first motor moves the vise member along an x direction, a pair of motors move the sliding member along an y direction, and a second motor rotates a portion of the robotic jack stand by an angle theta around a z direction. The autonomous system further includes a localization system to determine a spatial location of the robotic jack stand in reference to the x direction, the y direction, and the angle theta.

20 Claims, 5 Drawing Sheets

(51) Int. Cl.
*B25J 11/00* (2006.01)
*B25J 15/02* (2006.01)

(58) Field of Classification Search
USPC .......................................................... 700/245
See application file for complete search history.

(56) References Cited

U.S. PATENT DOCUMENTS

| | | | |
|---|---|---|---|
| 4,005,520 A | 2/1977 | Sanford | |
| 4,047,282 A | 9/1977 | Jureit et al. | |
| 4,111,114 A | 9/1978 | Carr | |
| 4,334,346 A | 6/1982 | Jensen | |
| 4,384,515 A | 5/1983 | Matlock | |
| 4,479,600 A | 10/1984 | Albright | |
| 4,669,184 A | 6/1987 | Castillo | |
| 5,111,861 A | 5/1992 | Gore et al. | |
| 5,361,495 A | 11/1994 | Pyle et al. | |
| 6,112,968 A | 9/2000 | Jin et al. | |
| 6,318,251 B1 | 11/2001 | Schulz | |
| 6,560,858 B1 * | 5/2003 | McAdoo | B27F 7/155 |
| | | | 269/910 |
| 6,651,306 B1 | 11/2003 | LePoire et al. | |
| 6,976,305 B2 * | 12/2005 | Kanjee | B27F 7/155 |
| | | | 269/910 |
| 7,093,350 B2 * | 8/2006 | McNeelege | B27F 7/155 |
| | | | 29/709 |
| 7,111,391 B2 * | 9/2006 | McAdoo | E04C 3/17 |
| | | | 29/772 |
| 7,621,053 B2 * | 11/2009 | Bianchin | B25H 7/00 |
| | | | 33/16 |
| 7,870,879 B2 | 1/2011 | Koskovich | |
| 9,387,558 B2 * | 7/2016 | Muncie | B23P 19/04 |
| 9,409,309 B2 * | 8/2016 | Kanjee | B27F 7/155 |
| 10,858,237 B2 | 12/2020 | Kane | |
| 2003/0196326 A1 * | 10/2003 | McAdoo | B23Q 1/032 |
| | | | 29/432 |
| 2004/0181936 A1 | 9/2004 | Jin et al. | |
| 2008/0172983 A1 | 7/2008 | Urmson | |
| 2010/0030369 A1 | 2/2010 | McAdoo et al. | |
| 2010/0061829 A1 | 3/2010 | McAdoo et al. | |
| 2013/0042480 A1 | 2/2013 | Turulin | |
| 2013/0082429 A1 | 4/2013 | Kiviniemi et al. | |
| 2021/0016404 A1 | 1/2021 | Ulrich et al. | |
| 2021/0053220 A1 * | 2/2021 | Ames | B25J 9/1664 |
| 2021/0405607 A1 | 12/2021 | Nguyen | |
| 2022/0009122 A1 | 1/2022 | Turulin et al. | |
| 2023/0173690 A1 | 6/2023 | Baker et al. | |
| 2023/0191543 A1 * | 6/2023 | Feied | B21J 5/08 |
| | | | 29/33 R |
| 2025/0065533 A1 | 2/2025 | Cahn et al. | |

OTHER PUBLICATIONS

U.S. Appl. No. 18/810,271, filed Aug. 20, 2024, System and Method for Installing Nail Plates in Wooden Structures, Aaron Cahn, et al.
International Search Report and Written Opinion for International Patent Application No. PCT/US2024/043103, dated Nov. 7, 2024.
International Search Report and Written Opinion for International Patent Application No. PCT/US2024/044499, dated Nov. 15, 2024.

\* cited by examiner

SYSTEM AND METHOD FOR SUPPORTING WOODEN MEMBERS DURING INSTALLATION OF NAIL PLATES IN WOODEN STRUCTURES

CROSS-REFERENCE TO RELATED APPLICATIONS

The present application claims the benefit of and priority to U.S. Provisional Application No. 63/579,471, entitled "System and Method for Supporting Wooden Members During Installation of Nail Plates in Wooden Structures," and filed on Aug. 29, 2023, which is incorporated herein by reference in its entirety.

FIELD OF TECHNOLOGY

The present disclosure relates generally to the construction of wooden frame support structures, and more specifically, to automated systems and methods for the assembly of trusses in residential and industrial building construction settings.

BACKGROUND

Residential and industrial building construction requires support members for carrying and distributing the load from the structures to the foundation. Additionally, support members provide lateral stability to the entire building construction. The two main types of support members commonly used in residential and industrial building construction are trusses and rafters. However, trusses are preferred over rafters mainly because (i) trusses are more cost-effective than rafters (e.g., trusses can be pre-fabricated and arrive on the project site fully assembled whereas rafters are built piece-by-piece on site); and (ii) trusses are structurally superior to rafters, which allows them to span longer distances without direct support underneath them.

A truss can be made out of wood or steel and is characterized by its web-like design that allows the truss to distribute the load through a combination of tension and compression in each member. The two most common categories of trusses used in buildings are roof trusses and floor trusses. Roof trusses commonly form a peak in a triangular shape, whereas floor trusses are two parallel chords reinforced with webs in between. Basic members of a truss structure are one or more top chords, a bottom chord (or beam), and the pieces forming the web interposed between the bottom chord and the one or more top chords. Metal connectors or nail plates are used to connect and secure the members together.

Existing fabrication methods for building trusses predominately use manual labor, which can be expensive, time consuming, and prone to errors. Therefore, there is a need for a fully automated method and systems that would provide a low-cost, fast, and error-free alternative to existing labor-intensive fabrication methods and systems.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

A system and method for the automated fabrication of truss structures is disclosed herein. According to some embodiments, the disclosed system is configured to: (i) receive the truss members in the form of precut lumber, (ii) place the members in position according to the truss design, (iii) install nail plates to predetermined locations of the truss structure to connect and secure the members together, and (iv) move the fully assembled truss to a storage area. In some embodiments, the disclosed system is also configured to: (i) interface with a fully automated system that pre-cuts the lumber according to specification (e.g., by length and cut angle); (ii) receive orders specifications for the truss structures to be built, schedule those orders, and assemble the truss structures according to the order specifications autonomously or with limited input; (iii) assemble any type of truss structure, including floor and roof truss structures; and (iv) handle graded wood. By way of example and not limitation, the system can include robotic arms or mobile robots configured to: (i) properly place the members for assembly in predetermined locations according to the order specification, (ii) rotate and orient the members as appropriate for the nail plate installation, (iii) install the nail plates at the joint locations, and (iv) secure the members while the nail plates are installed.

In some embodiments, the nail plate installation is achieved via a portable C-clamp press positioned over each joint location requiring nail plate installation. In some examples, the C-clamp press can be a hydraulic press capable of delivering no less than 25 tons of force. The hydraulic press can be equipped with a top and bottom pressing plates having respective magnet covers attached to the inner surfaces of the pressing plates for the purposes of magnetically holding the nail plate before installation. According to some embodiments, the top and bottom pressing plates, the magnet cover plates, and the coupler that attaches these plates to the hydraulic cylinder are custom-made steel parts. In yet another embodiment, the C-clamp press can be either mounted on a mobile robot or on a robotic arm.

In further embodiments, stationary robotic jack stands secure the web members in place while additional jack stands secure the chord members and drive them towards the web members to form the truss structure. Subsequently, a mobile robot or a robotic arm equipped with the C-clamp moves into place to install the nail plates on both sides of each joint.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
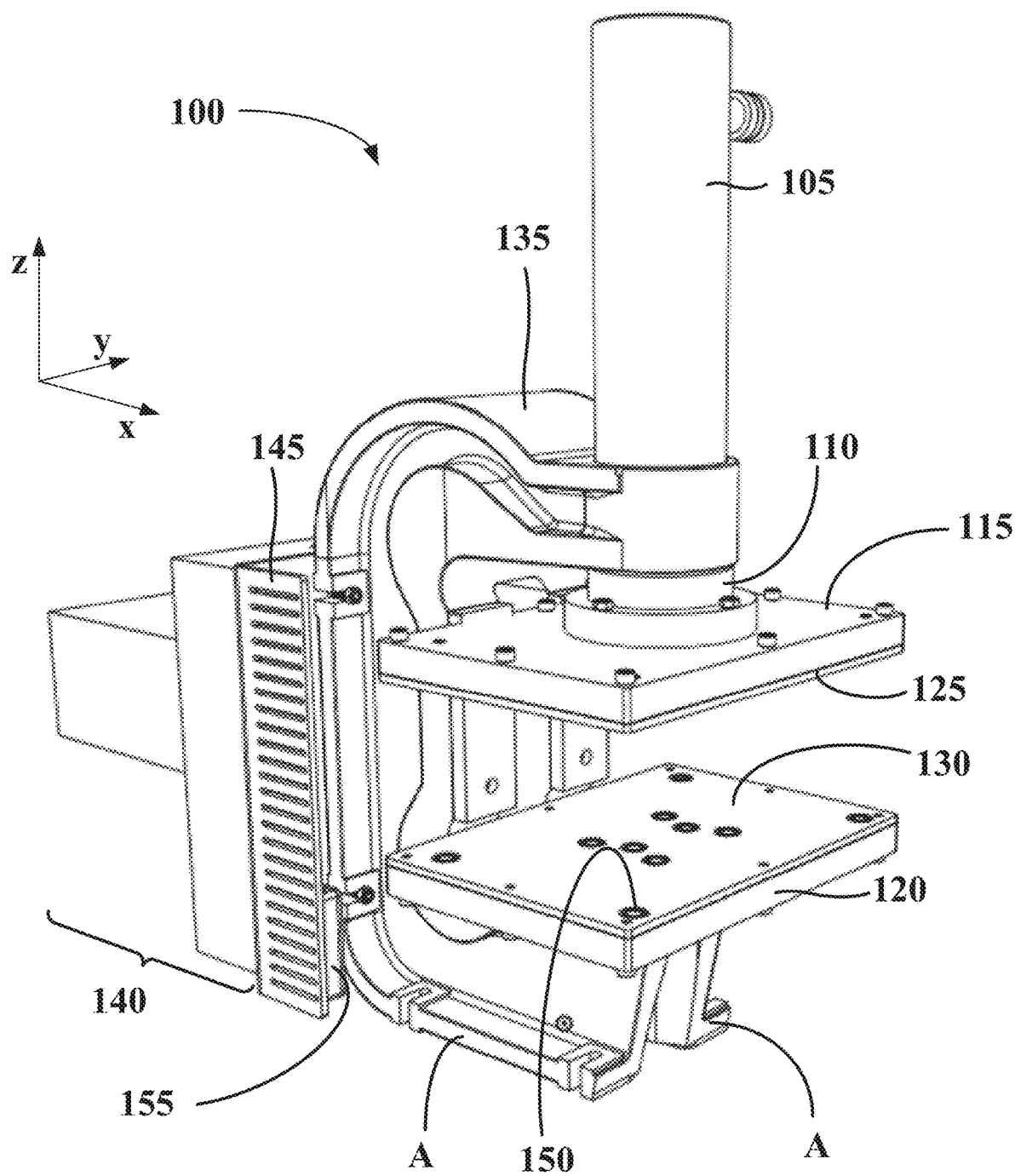
FIG. 1 is an isometric view of a C-clamp press, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Apparatus and methods for automating the fabrication process of wooden truss structures is provided herein. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Description of the C-Clamp Press

FIG. 1 is an isometric view of a portable hydraulic C-clamp press 100 (thereafter "C-clamp press 100") used for the nail plate installation in a truss structure, according to some embodiments. By way of example and not limitation, C-clamp press 100 can be attached to a mobile robot or onto a robotic arm configured to support and appropriately position the C-clamp press 100 in the three-dimensional (3D) space as required. According to some embodiments, C-clamp press 100 includes a hydraulic cylinder 105, a plate coupler 110, top and bottom pressing plates 115 and 120, and top and bottom magnet plates 125 and 130. All the aforementioned components are supported via a C-clamp structure 135. According to some embodiments, hydraulic cylinder 105 is operated via pump 140, which is attached to a backside of the C-clamp structure 135 via a mounting plate 145. In further embodiments, C-clamp press 100 can be attached to a mobile robot or onto a robotic arm from attachment end portions A of C-clamp structure 135. By way of example and not limitation, C-clamp press 100 may be attached to the mobile robot or onto the robotic arm upside down relative to the orientation shown in FIG. 1, or in any suitable orientation.

In some embodiments, each of the top and bottom magnetic plates features inserts for stud magnets 150. In further embodiments, nail plates to be installed are secured in place on the stud magnets 150 mounted in various patterns/locations throughout the respective top and bottom pressing plates 115 and 120. This configuration enables installation of the nail plates in hard to reach joints and secures the nail plates in place while the C-clamp press 100 is in motion or stationary in a non-vertical position. In some embodiments, the nail plate feeding mechanism can be separate from C-clamp press 100. In other embodiments, the nail plate feeding mechanism can be integrated into the C-clamp press 100. It is noted that the nail plate feeding mechanism is not shown in FIG. 1.

In some embodiments, top and bottom pressing plates 115 and 120, top and bottom magnet plates 125 and 130, and plate coupler 110 can be custom designed to ensure that the force exerted on the nail plate is uniform during the nail plate installation process, and that nail plates with different dimensions can be supported. In yet another embodiment, different types of top and bottom pressing plates 115 and 120, and top and bottom magnet plates 125 and 130 may be used depending on the type and dimensions of the nail plates, the type of wood used, the design of the truss structure, etc.

In some embodiments, the electronic controllers of the C-clamp press 100 may be self-contained within the C-clamp press structure. In some embodiments, electronic controllers, like electronic controllers 155 shown in FIG. 1, may be attached to internal or external surfaces of the mounting plate 145. By way of example and not limitation, electronic controllers 155 may include a single-board computer (thereafter referred to as "computer"), such as a raspberry pi, that controls the entire press, including the operation of the pump, via a relay and a solenoid not shown in FIG. 1. A pressure transducer connected to the hydraulic line feeding the hydraulic cylinder 105 can provide pressure reading to the computer. With these components, the C-clamp press 100 can turn itself on, determine when a nail plate is fully embedded into the joints using the pressure readings from the pressure transducer, turn itself off, and depressurize automatically.

In some embodiments, C-clamp press 100 can be configured to apply 25 tons of force during the nail plate installation process. In some embodiments, and once the nail plates have been installed, the truss structure does not need to pass through a finishing roller, which reduces the production time.

Description of the Robotic Jack Stands

According to some embodiments, the robotic jack stands (or jack stands) are self-contained motorized units configured to hold the members of the truss structure and move them into predetermined positions, according to the truss structure design, prior to the nail plate installation.

Figure 2A:
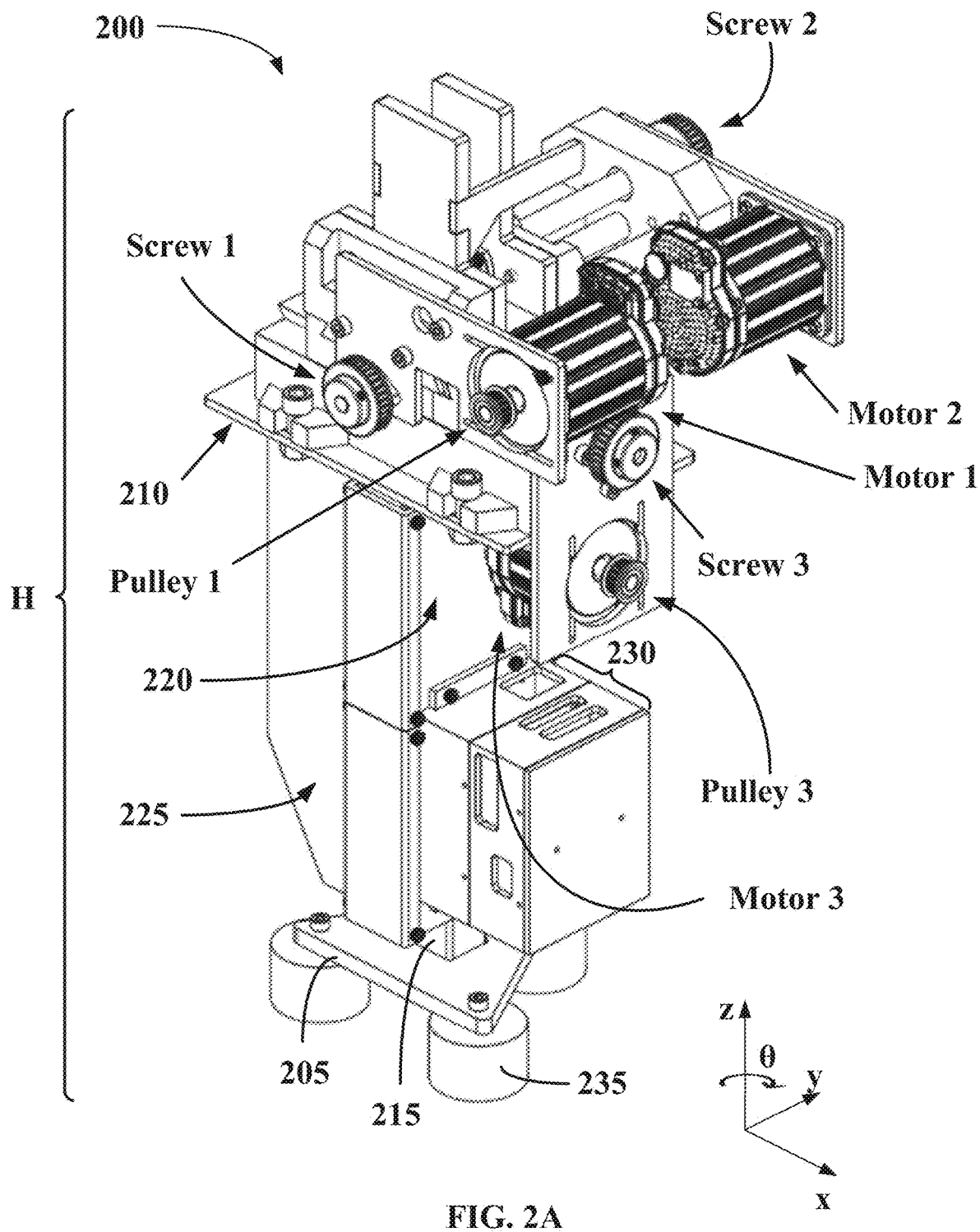
FIG. 2A is an isometric view of jack stand, in accordance with some embodiments.

FIG. 2A is an isometric view of a jack stand 200, according to some embodiments. By way of example and not limitation, jack stand 200 has a height H of about 30 inches or about 74 cm and is supported by a base plate 205, top plate 210, a vertical tubing structure 215 connecting the base plate 205 and the top plate 210, an electronics box plate 220, and a battery plate (not visible in the isometric view of FIG. 2A) opposite to the electronics box plate 220 with respect to vertical tubing structure 215. According to some embodiments, a battery pack 225 is attached to the battery plate while electronic components 230 are attached to the electronic box plate 220. In some embodiments, power can be supplied from an external source. In some examples, power can be supplied directly, e.g., without a battery pack 225, and/or with both the battery pack 225 and plugged into an external power supply.

In some embodiments, a component 235 is attached to the base plate 205, as shown in FIG. 2A, configured to secure jack stand 200 to any flooring or wall surface. In some embodiments, the component 235 can include and/or be referred to as an attachment component 235. The attachment component 235 can be attached to the base plate 205, where the attachment component 235 can disengage an attachment mechanism of the attachment component 235 when the robot lifts the jack stand from the flooring, wall surface and/or any other type of working surface, and to engage when the mobile robot positions the robotic jack stand onto the working surface. In some examples, the attachment component 235 can include at least one of an electromagnet, or a suction cup. The attachment mechanism can include at least one of an electromagnetic attachment mechanism, a suction attachment mechanism, or an electrostatic attachment mechanism, among others. The working surface (e.g., flooring or wall surface) can be made from a ferromagnetic material, such as iron, steel, etc. For example purposes, attachment component 235 will be described thereafter in the context of electromagnets (e.g., electromagnets 235). Based on the disclosure herein, suction cups, as discussed above, can also be used, or any combination of electromagnets and suction cups without limitation.

According to some embodiments, electromagnets 235 are magnetized when not connected to a power source and demagnetized when connected to a power source. Thus, when a mobile robot or robotic arm (thereafter referred to as "robot") attaches to the jack stand, the robot can send an electric signal to deactivate the electromagnets 235 so that the jack stand can be raised, moved, and re-attached to a new position. In some embodiments, the robot may place the jack stand 200 to an exact or an approximate position on the flooring surface and at a desirable angle orientation so that the jack stand 200 may hold the member conveniently for the assembly process. When the robot detaches from the jack stand 200, the electromagnets 235 disconnect from the power, are magnetized and secured on the flooring surface.

Figure 2B:
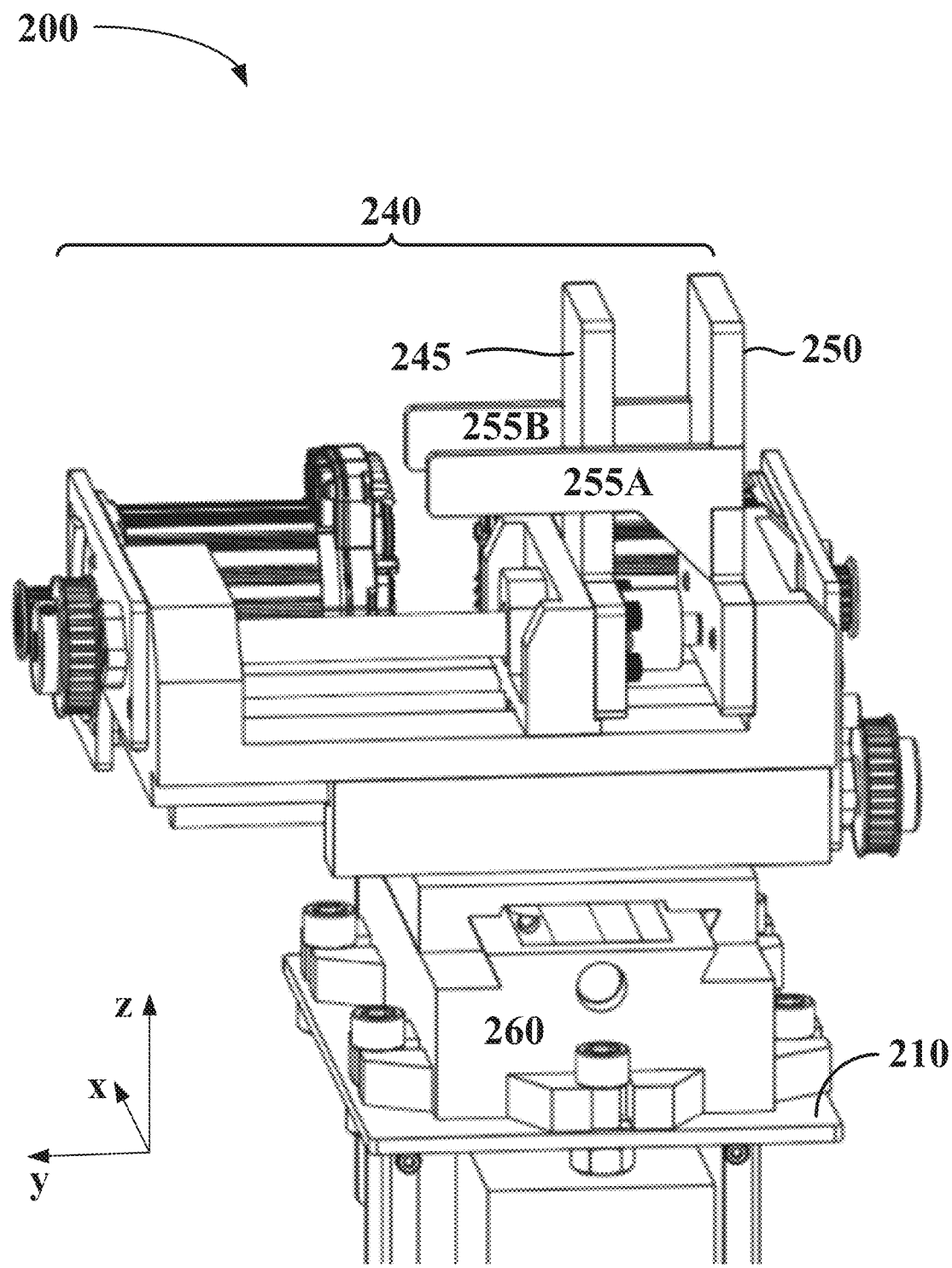
FIG. 2B is partial isometric view of a jack stand, in accordance with some embodiments.

According to some embodiments, jack stand 200 has a cross-slide vise configuration that allows the vise to move along the x-direction, as shown in FIG. 2A. A partial isometric view of jack stand 200 showing vise 240 in greater detail is depicted in FIG. 2B. Sliding clamp 245 moves in the y-direction while back plate 250 remains stationery. Accordingly, jack stand 200 may secure a member of the truss structure between sliding clamp 245 and the stationery back plate 250. The secured members of the truss may rest on arms 255 A and 255 B. The entire vise may move in the x-direction, as shown in FIG. 2B, by sliding onto base member 260, which is secured directly on top plate 210.

By way of example and not limitation, the maximum opening of vise 240 can be 6 inches or 15.2 cm, and the minimum opening can be 1 inch or 2.5 cm. According to some embodiments, there are three motors (shown better in FIG. 2A) that control the movement of vise 240. In the example of FIG. 2A, two motors, motors 1 and 2, control the clamping action along the y-direction and a third motor, motor 3, controls the movement of vise 240 along the x-direction. In some embodiments, each of the three motors sets in motion a pulley connected to a respective lead screw, allowing for a linear motion. For example, motor 1 can turn screw 1, motor 2 can turn screw 2, and motor 3 can turn screw 3. In some embodiments, motor 1 can be configured for coarse adjustments along the y-direction and motor 2 can be configured for fine adjustments along the y-direction. However, this is not limiting, and motor 2 can be configured for coarse adjustments along the y-direction and motor 1 can be configured for fine adjustments along the y-direction. Accordingly, wood members can be clamped onto vise 240 using the coarse adjustment motor (e.g., motor 1), then the jack stand may communicate with a motion capture system to allow for fine adjustment along the y-direction via the fine adjustment motor (e.g., motor 2), and x-direction adjustment via motor 3 to ensure that the wood member is in a suitable position for assembly, accounting for any crowning and/or bowing of the wood member.

According to some embodiments, jack stand 200 may be further configured to rotate around vertical axis z by an angle theta (θ) shown in FIG. 2A. For example, a top surface of the base plate 205 of jack stand 200 may be configured to rotate (e.g., via a motor not shown in FIG. 2A) around the vertical tubing structure 215 by an angle θ. In another example, a portion of the jack stand 200 above the base plate 205 may be configured to rotate around the vertical tubing structure 215 by an angle θ.

Truss Assembly Process

Figure 3:
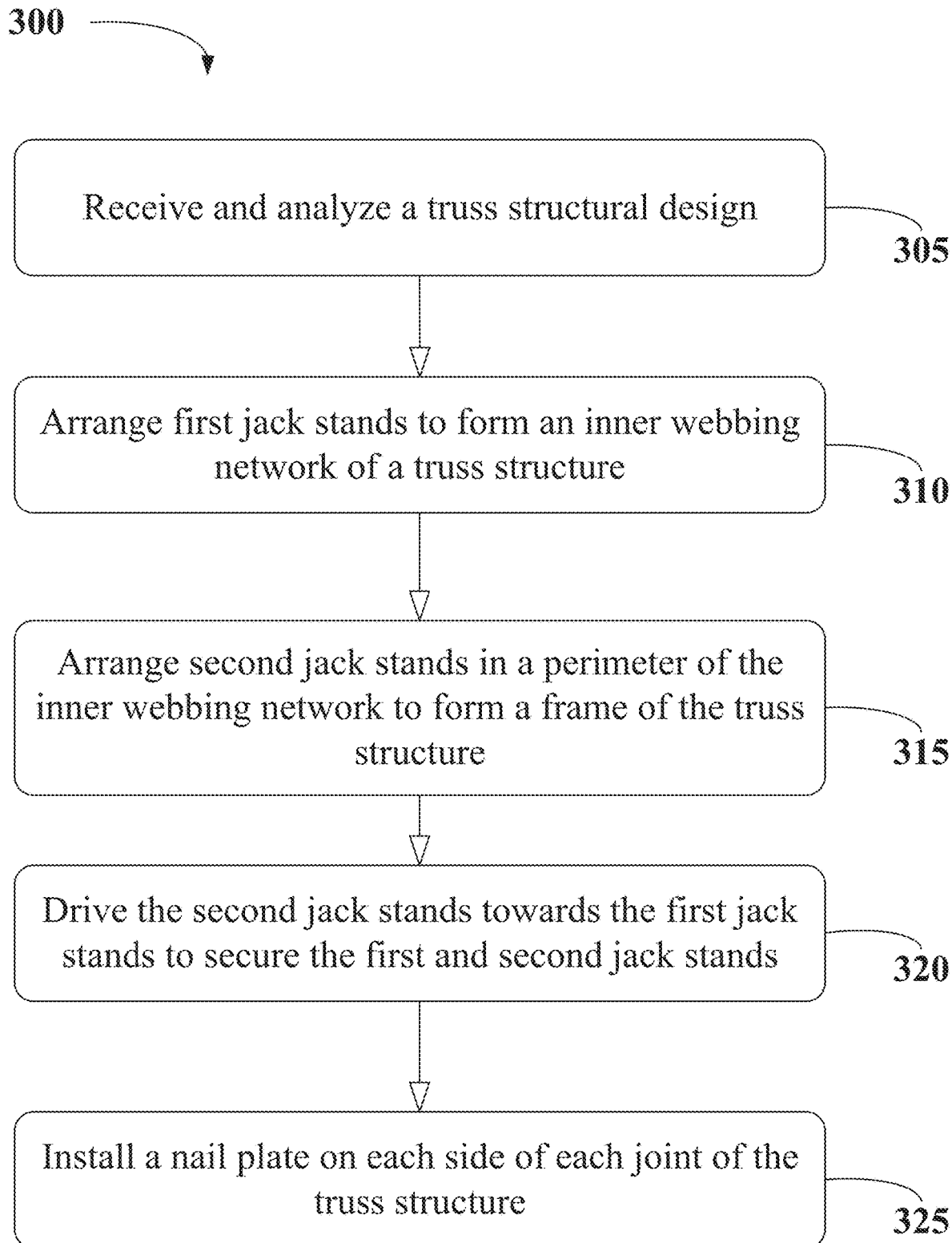
FIG. 3 is a flowchart of a truss assembly method using one or more C-clamp presses and any suitable number of jack stands, in accordance with some embodiments.

According to some embodiments, FIG. 3 is a flowchart of a truss assembly method 300 using one or more C-clamp presses, like C-clamp press 100 shown in FIG. 1, and any number of jack stands, like jack stand 200 shown in FIGS. 2A and 2B. According to some embodiments, the one or more C-clamp presses and the jack stands are operated by programmable mobile robotic units or robotic arms thereafter simply referred to as "robot" or "robots".

This disclosure is not limited to this operational description. It is to be appreciated that additional operations may be performed. Moreover, not all operations may be needed to perform the disclosure provided herein. Additionally, some or all of the operations may be performed simultaneously, substantially at the same time, or in a different order than shown in FIG. 3. In some embodiments, one or more other operations may be performed in addition to or in place of the presently described operations.

Method 300 begins with operation 305 where a structural design of a truss is received and subsequently analyzed. In some embodiments, the design can be in any suitable format, such as a computer-aided design (CAD) generated in-house or from a third-party. In some embodiments, during the analysis of the design a system can determine the type and position of each chord and web member within the truss structure, the type of wood to be used, the length, the cutting angle, and overall dimensions of each wooden member, the location and number of joints, the overall dimensions of the structure, the number of members and the number of C-clamp presses and jack stands required for the assembly, the number of automated robots required to assist with the assembly, etc.

Once the structural design has been received and analyzed, method 300 proceeds to operation 310 where first jack stands holding wood members of the web structure are positioned by the robots in predetermined locations on the floor to form the inner webbing network of the truss structure according to the desired truss design. In some embodiments, the first jack stands are holding the wood members of the web structure in any suitable orientation. In further embodiments, a robot can be configured to place the wood members on the vise of each first jack stand. Further, each of the first jack stands can be configured to communicate with a motion capture system to perform fine adjustments on its grip along the y-direction (via the second motor) and x-direction (via the third motor) and to ensure that the wood is in the desired position for assembly, as discussed above.

Once the first jack stands have been positioned in place, method 300 proceeds to operation 315 where robots position second jack stands holding the chord members of the truss structure in the perimeter of the inner webbing network. Similarly to the first jack stands, the second jack stands are holding the chords of the frame structure in any suitable orientation. Likewise, a robot can be configured to place and secure the chords on the vise of each second jack stand. Further, each of the second jack stands can be configured to communicate with a motion capture system to perform fine adjustments on its grip along the y-direction (via the second motor) and x-direction (via the third motor) and to ensure that the chords are in the desired position for assembly, as discussed above.

In some embodiments, the first jack stands are used to hold the webbing stationary while the second jack stands are configured to hold and actively lock (e.g., clamp) the chords to the members of the inner webbing network structure prior and during the nail plate installation. Therefore, in operation 320, the second jack stands are driven towards the first jack stands to secure the first and second jack stands in place in preparation for the nail plate installation during which the web members are permanently attached to the chord members and to each other.

After the chords are driven towards the inner webbing network structure and locked into place, robots carrying a C-clamp press move over each joint of the truss structure and install a nail plate on each side of the joint via a single press according to operation 325. As discussed above in connection to FIG. 1, each C-clamp press 100 is equipped with a top and bottom magnet plates 125 and 130, each configured to hold a nail plate. Therefore, C-clamp press 100 is able to install two nail plates with a single press action by embedding one nail plate on each side of the joint.

Once the nail plates have been installed, the fully assembled truss structure is released from the first and second jack stands and is collected by one or more robots. By way of example and not limitation, the assembled truss can be disposed on a rack for on-site delivery.

System Implementations

According to some embodiments, the C-clamp press and jack stands described herein are part of a larger system that includes, but is not limited to, additional components, modules, and sub-systems. According to some embodiments, these additional components, modules, and sub-systems are communicatively coupled to one another under the control of one or more processing units. Communication between these additional components, modules, and sub-systems may be achieved via wired or wireless communication over suitable communication protocols. These additional components, modules, and sub-systems may use appropriate software and hardware to control, for example, the equipment for cutting and preparing the parts of the truss structure, receive and execute the orders, provide instructions to the robots, receive measurements and readings from the C-clamp and the jack stands, evaluate and monitor the entire assembly process, provide instructions to the C-clamp presses and the jack stands, etc. In some implementations, the system may use artificial intelligence (AI) models or other suitable models to analyze the truss design and optimize the fabrication and assembly process. In additional implementations, the system can use computer vision and/or machine vision software and/or hardware to plan and/or take action on-the-fly based on the current position and/or current location of the building materials and provide instructions to the robots or other equipment, including the C-clamp presses and the jack stands.

According to some embodiments, an autonomous system for supporting wooden members is disclosed. The autonomous system includes a mobile robot controlled by the autonomous system, the mobile robot configured to lift, move, and position robotic jack stands in predetermined locations on a working surface. The autonomous system also includes a robotic jack stand having a base member with a bottom surface and electromagnets attached to the bottom surface. The electromagnets are operable to demagnetize when the mobile robot lifts the robotic jack stand from the working surface and magnetize when the mobile robot positions the robotic jack stand onto the working surface. The robotic jack stand also includes a vise member in a cross-slide configuration configured to secure a wooden member. The vise member includes a stationary member and a sliding member, a first motor operable to move the vise member along an x direction, a pair of motors operable to move the sliding member along an y direction, and a second motor operable to rotate a portion of the robotic jack stand above the base member by an angle theta around a z direction perpendicular to a plane defined by the x and y directions. Finally, the autonomous system may further include a localization system operable to enable the robotic jack stand to determine a spatial location of the robotic jack stand in reference to the x direction, the y direction, and the angle theta.

In further embodiments, a method for supporting members of wooden structures is disclosed. The method includes positioning, with a mobile robot, a robotic jack stand on a ferromagnetic working surface, where the robotic jack stand includes electromagnets that are demagnetized when electrically connected to a power source by the mobile robot and magnetized when electrically disconnected from the power source by the mobile robot. The method further includes positioning a member of a wooden structure on the robotic jack stand using a vise member by adjusting a position of a sliding member of the vise member relative to a stationary member of the vise member, where adjusting the position of the sliding member includes making a coarse adjustment of the sliding member along a first direction via a first motor and a fine adjustment of the sliding member along the first direction via a second motor. The method also includes adjusting, via a third motor, a position of the vice member along a second direction perpendicular to the first direction, and determining a spatial location of the robotic jack stand in reference to (i) the first direction, (ii) the second direction, and (iii) an angle theta around a third direction perpendicular to a plane defined by the first and second directions.

Alternative Implementations

It is to be appreciated that the system and methods disclosed herein may not be limited to the assembly of wooden truss structures. For example, the system and method discloses herein, with some modifications, may be used for the assembly of metallic truss structures. For example, in the case of a metallic truss structure, the C-clamp press may be replaced with a portable welding machine attached to and operated by the robotic arms. The portable welding machine may weld the metallic components of the truss structure together. At the same time, the operation of the jack stands will remain practically the same with the exception that the jack stands will now hold and secure metallic members of the truss structure instead of members made of wood.

Software and Hardware Implementations

Figure 4:
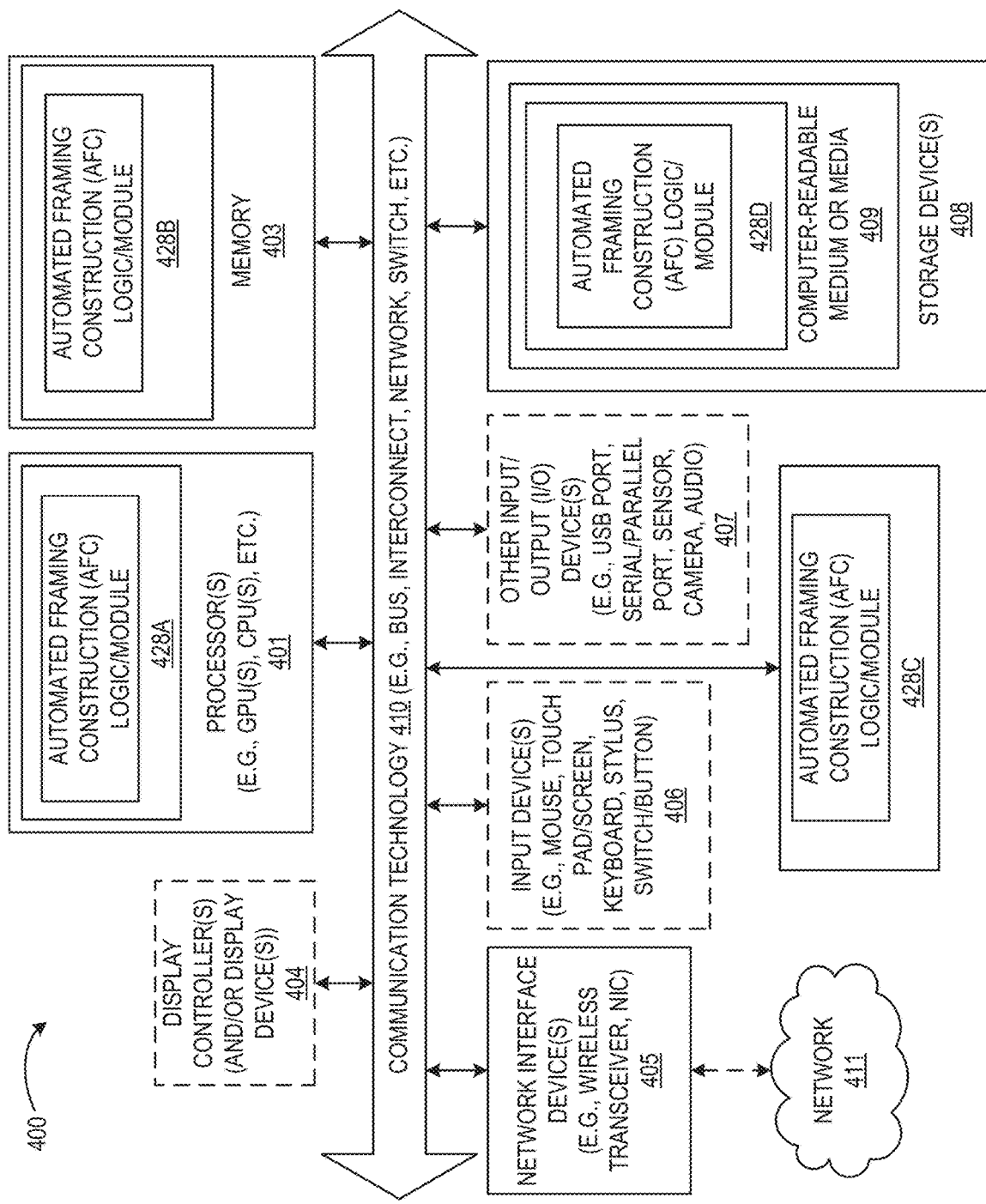
FIG. 4 a block diagram of an exemplary data processing system, in accordance with some embodiments.

FIG. 4 is a block diagram illustrating an exemplary data processing system 400 that may be used with one or more of the described embodiments. For example, the system 400 may represent any data processing system (e.g., one or more of the systems described above performing any of the operations or methods described above in connection with FIGS. 1-3, etc.). The system 400 can include many different components. These components can be implemented as integrated circuits (ICs), portions thereof, discrete electronic devices, or other modules adapted to a circuit board such as a motherboard or add-in card of a computer system, or as components otherwise incorporated within a chassis of a computer system. Note also that the system 400 is intended to show a high-level view of many, but not all, components of the computer system. Nevertheless, it is to be understood that additional components may be present in certain implementations and furthermore, different arrangements of the components shown may occur in other implementations. The system 400 may represent a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute instructions to perform any of the methodologies discussed herein.

For one embodiment, the system 400 includes processor(s) 401, memory 403, devices 405-409, and device 404 via a communication technology 410 (e.g., a bus, an interconnect, a network, a switch, any other suitable communication technology, or any combination thereof, etc.). The system 400 also includes a network 411. Processor(s) 401 may represent a single processor or multiple processors with a single processor core or multiple processor cores included therein. Processor(s) 401 may represent one or more general-purpose processors such as a microprocessor, a central processing unit (CPU), graphics processing unit (GPU), or the like. More particularly, processor(s) 401 may be a complex instruction set computer (CISC), a reduced instruction set computer (RISC) or a very long instruction word (VLIW) computer architecture processor, or processors implementing a combination of instruction sets. Processor(s) 401 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any logic that can process instructions.

Processor(s) 401, which may be a low power multi-core processor socket such as an ultra-low voltage processor, may act as a main processing unit and central hub for communication with the various components of the system. Such processor(s) can be implemented as one or more system-on-chip (SoC) integrated circuits (ICs). An automated framing construction logic/module 428A may reside, completely or at least partially, within processor(s) 401. In one embodiment, the AFC logic/module 428A enables the processor(s) 401 to perform any or all of the operations described above in connection to method 300. Additionally, or alternatively, the processor(s) 401 may be configured to execute instructions for performing the operations and methodologies discussed herein.

System 400 may further include a graphics interface that communicates with optional graphics subsystem 404, which may include a display controller, a graphics processing unit (GPU), and/or a display device. Processor(s) 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor(s) 401 or any other device. For example, executable code and/or data from a variety of operating systems, device drivers, firmware (e.g., input output basic system or BIOS), and/or applications can be loaded in memory 403 and executed by processor(s) 401. An operating system can be any kind of operating system. An AFC logic/module 428D may also reside, completely or at least partially, within memory 403.

For one embodiment, the memory 403 includes an AFC logic/module 428B as executable instructions. For another embodiment, when the instructions represented by AFC logic/module 428B are executed by the processor(s) 401, the instructions cause the processor(s) 401 to perform any, all, or some of the operations or methods described above in connection with FIGS. 1-3.

System 400 may further include input/output (I/O) devices such as devices 405-408, including network interface device(s) 405, optional input device(s) 406, and other optional input/output (I/O) device(s) 407. Network interface device(s) 405 may include a wired or wireless transceiver and/or a network interface card (NIC). The wireless transceiver may be a Wireless Fidelity (Wi-Fi) transceiver, an infrared transceiver, a Bluetooth transceiver, a Worldwide Interoperability for Microwave Access (WiMAX) transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with display device 404), a pointer device such as a stylus, and/or a keyboard (e.g., a physical keyboard or a virtual keyboard displayed as part of a touch sensitive screen). For example, input device 406 may include a touch screen controller coupled to a touch screen. The touch screen and touch screen controller can, for example, detect contact and movement or a break thereof using one or more touch sensitivity technologies, including but not limited to capacitive, resistive, infrared, and surface acoustic wave technologies, as well as other proximity sensor arrays or other elements for determining one or more points of contact with the touch screen.

I/O devices 407 may include an audio device. An audio device may include a speaker and/or a microphone to facilitate voice-enabled functions, such as voice recognition, voice replication, digital recording, and/or telephony functions. Other I/O devices 407 may include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to communication technology 410 via a sensor hub (not shown), while other devices such as a keyboard or thermal sensor may be controlled by an embedded controller (not shown), dependent upon the specific configuration or design of system 400.

To provide for persistent storage for information such as data, applications, one or more operating systems and so forth, a mass storage device or devices (not shown) may also be coupled to processor(s) 401. For various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. In addition, a flash device may be coupled to processor(s) 401, e.g., via a serial optional peripheral interface (SPI). This flash device may provide for non-volatile storage of system software, including a basic input/output software (BIOS) and other firmware.

An AFC logic/module 428C may be part of a specialized stand-alone computing system/device that is formed from hardware, software, or a combination thereof. For one embodiment, the AFC logic/module 428C performs any, all, or some of the operations or methods described above in connection with FIGS. 1-3.

Storage device 408 may include computer-accessible storage medium 409 (also known as a machine-readable storage medium or a computer-readable medium) on which one or more sets of instructions or software are stored—e.g., an AFC logic/module 428D.

For one embodiment, the instruction(s) or software stored on storage medium 409 embody one or more methodologies or functions described above in connection with FIGS. 1-3. For another embodiment, the storage device 408 includes an AFC logic/module 428D as executable instructions. When the instructions represented by an AFC logic/module 428D are executed by the processor(s) 401, the instructions cause the system 400 to perform any, all, or some of the operations or methods described above in connection with FIGS. 1-3.

Computer-readable storage medium 409 can store some or all of the software functionalities of an AFC logic/module 428A-428D described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the system 400 and that cause the system 400 to perform any one or more of the disclosed methodologies. The term "computer-readable storage medium" shall accordingly be taken to include, but not be limited to, solid-state memories, and optical and magnetic media, or any other non-transitory machine-readable medium.

Note that while system 400 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

In the foregoing description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network 411, a communication technology 410. Examples of communication networks 410 and 411 include a local area network ("LAN") and a wide area network ("WAN"), e.g., the Internet, a fiber network, a storage network, or a combination thereof, wired or wireless. Components of a network 410 and/or 411 do not have to be physically co-located. For example, separate components in system 400 may be linked directly over a network 410 or 411 even though these components may not be physically located next to each other. For example, two or more of the display controller/device 404, the processor(s) 401, the memory 403, the network interface device(s) 405, the input devices 406, and other I/O device(s) 407 are in distinct physical locations from each other and are communicatively coupled via the communication technology 410 and/or network 411, each of which can include an interconnect, a network, or a switch that links these components.

The computing system 400 can include clients and servers. A client and server are generally remote from each other and typically interact through a communication network (e.g., communication technology 410, network 411, any combination thereof, etc.). The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An autonomous system for supporting wooden members, the autonomous system comprising:
a mobile robot controlled by the autonomous system, the mobile robot configured to lift, move, and position robotic jack stands in predetermined locations on a working surface;
a robotic jack stand comprising:
a base member with a bottom surface;
an attachment component coupled to the bottom surface, wherein the attachment component is operable to disengage an attachment mechanism of the attachment component when the mobile robot lifts the robotic jack stand from the working surface, and to engage when the mobile robot positions the robotic jack stand onto the working surface, and wherein the attachment component is one or more electromagnet or one or more suction caps;
a vise member in a cross-slide configuration configured to secure a wooden member, the vise member comprising a sliding member and a stationary member;
a first motor operable to move the vise member along an x direction;
a pair of motors operable to move the sliding member along an y direction; and
a second motor operable to rotate a portion of the robotic jack stand above the base member by an angle theta around a z direction perpendicular to a plane defined by the x and y directions; and
a localization system operable to enable the robotic jack stand to determine a spatial location of the robotic jack stand in reference to the x direction, the y direction, and the angle theta.

2. The system of claim 1, wherein the attachment component is one or more electromagnets.

3. The system of claim 1, wherein the attached component is one more suction caps.

4. The system of claim 1, wherein the robotic jack stand further comprises:
a top member positioned underneath the vice member; and
a vertical tubing structure connecting a top surface of the base member with the top member.

5. The system of claim 4, wherein the robotic jack stand further comprises:
an electronics box member; and
a battery member located opposite to the electronics box member with respect to the vertical tubing structure.

6. An autonomous system for supporting wooden members, the autonomous system comprising:
a mobile robot controlled by the autonomous system, the mobile robot configured to lift, move, and position robotic jack stands in predetermined locations on a working surface;
a robotic jack stand comprising:
a base member with a bottom surface;
electromagnets attached to the bottom surface, wherein the electromagnets are operable to demagnetize when the mobile robot lifts the robotic jack stand from the working surface, and magnetize when the mobile robot positions the robotic jack stand onto the working surface;
a vise member in a cross-slide configuration configured to secure a wooden member, the vise member comprising a sliding member and a stationary member;
a first motor operable to move the vise member along an x direction;
a pair of motors operable to move the sliding member along an y direction; and
a second motor operable to rotate a portion of the robotic jack stand above the base member by an angle theta around a z direction perpendicular to a plane defined by the x and y directions; and
a localization system operable to enable the robotic jack stand to determine a spatial location of the robotic jack stand in reference to the x direction, the y direction, and the angle theta.

7. The system of claim 6, wherein the robotic jack stand further comprises:
a top member positioned underneath the vice member; and
a vertical tubing structure connecting a top surface of the base member with the top member.

8. The system of claim 7, wherein the robotic jack stand further comprises:
an electronics box member; and
a battery member located opposite to the electronics box member with respect to the vertical tubing structure.

9. The system of claim 8, wherein the robotic jack stand further comprises:
a battery pack attached to the battery member; and
an electronic component member attached to the electronic box member.

10. The system of claim 7, wherein the vise member is operable to slide along the x-direction over the top member.

11. The system of claim 6, wherein the electromagnets are configured to attach to at least one of a metallic wall or metallic flooring when magnetized.

12. The system of claim 6, wherein the working surface comprises a ferromagnetic material.

13. The system of claim 12, wherein the ferromagnetic material comprises at least one of iron, or steel.

14. The system of claim 6, wherein the mobile robot comprises a robotic arm.

15. The system of claim 6, wherein the mobile robot is operable to send an electric signal to demagnetize the electromagnets to move the robotic jack stand away from the working surface.

16. A method for supporting members of wooden structures, the method comprising:
positioning, with a mobile robot, a robotic jack stand on a ferromagnetic working surface, wherein the robotic jack stand comprises electromagnets that are demagnetized when electrically connected to a power source by the mobile robot and magnetized when electrically disconnected from the power source by the mobile robot;
positioning a member of a wooden structure on the robotic jack stand using a vise member by adjusting a position of a sliding member of the vise member relative to a stationary member of the vise member, wherein adjusting the position of the sliding member comprises making a coarse adjustment of the sliding member along a first direction via a first motor and a fine adjustment of the sliding member along the first direction via a second motor;
adjusting, via a third motor, a position of the vice member along a second direction perpendicular to the first direction; and determining a spatial location of the robotic jack stand in reference to the first direction, the second direction, and an angle theta around a third direction perpendicular to a plane defined by the first and second directions.

17. The method of claim 16, wherein adjusting the position of the vice member further comprises adjusting the angle theta with a fourth motor.

18. The method of claim 16, wherein positioning the robot jack stand comprises electrically connecting the power source to the electromagnets to release the robot jack stand from the ferromagnetic working surface and electrically disconnecting the power source to the electromagnets to secure the robot jack stand on a new position on the ferromagnetic working surface.

19. The method of claim 16, wherein adjusting, via the third motor, the position of the vice member comprises sliding in a linear motion the vice member along the second direction.

20. The method of claim 16, wherein adjusting the position of the sliding member comprises making the fine adjustment after the coarse adjustment.

\* \* \* \* \*